(12) United States Patent
Roeck et al.

(10) Patent No.: US 10,306,380 B2
(45) Date of Patent: May 28, 2019

(54) HEARING ASSISTANCE SYSTEM AND METHOD

(71) Applicant: SONOVA AG, Stäfa (CH)

(72) Inventors: Hans-Ueli Roeck, Hombrechtikon (CH); Stephan Gehring, Uerikon (CH)

(73) Assignee: Sonova AG, Stäfa (CH)

( * ) Notice: Subject to any disclaimer, the term of this patent is extended or adjusted under 35 U.S.C. 154(b) by 95 days.

(21) Appl. No.: 15/506,910

(22) PCT Filed: Sep. 15, 2014

(86) PCT No.: PCT/EP2014/069591
§ 371 (c)(1),
(2) Date: Feb. 27, 2017

(87) PCT Pub. No.: WO2014/184394
PCT Pub. Date: Nov. 20, 2014

(65) Prior Publication Data
US 2018/0234777 A1    Aug. 16, 2018

(51) Int. Cl.
*H04L 1/00* (2006.01)
*G10L 19/22* (2013.01)
(Continued)

(52) U.S. Cl.
CPC ............ *H04R 25/552* (2013.01); *G10L 19/22* (2013.01); *H04L 1/0001* (2013.01); *H04L 1/0014* (2013.01); *H04R 25/30* (2013.01); *H04R 25/554* (2013.01); *G10L 25/69* (2013.01); *H04B 17/318* (2015.01); *H04R 2225/53* (2013.01);
(Continued)

(58) Field of Classification Search
CPC ...... H04R 25/30; H04R 25/305; H04R 25/43; H04R 25/55; H04R 25/552; H04R 25/554; H04R 2225/53; H04R 2225/55; H04L 1/0001; H04L 43/0817; H04L 12/2642;
(Continued)

(56) References Cited

U.S. PATENT DOCUMENTS 8,041,066 B2   10/2011   Solum
8,050,439 B2   11/2011   Inoshita et al.
(Continued)

FOREIGN PATENT DOCUMENTS

EP    2 498 514 A1    9/2012
EP    2 590 436 A1    5/2013
(Continued)

*Primary Examiner* — Jesse A Elbin

(57) ABSTRACT

A hearing assistance system having a first hearing device worn at a first of a user's ears, a second hearing device worn at a second of the user's ears, and an external audio source device for transmitting an external audio data stream, each hearing device having an interface for wireless data exchange with the external device, including receipt of the external audio data stream, the hearing devices being adapted to establish a binaural link between the first and second hearing devices, the hearing assistance system being adapted to estimate the quality of at least one of the links from the external device to the hearing devices. The hearing assistance system is adapted to dynamically adjust the coding of the audio stream transmitted by the external device according to the estimated quality of the at least one of the links from the external device to the hearing devices.

11 Claims, 6 Drawing Sheets

(51) Int. Cl.
*G10L 25/69* (2013.01)
*H04R 25/00* (2006.01)
*H04W 40/12* (2009.01)
*H04B 17/318* (2015.01)

(52) U.S. Cl.
CPC ...... *H04R 2225/55* (2013.01); *H04R 2225/61* (2013.01); *H04R 2460/03* (2013.01); *H04W 40/12* (2013.01)

(58) Field of Classification Search
CPC ... H04B 17/309; H04B 17/318; H04W 40/02; H04W 40/12
USPC ............ 700/94; 381/60, 315; 455/3.06, 41.2
See application file for complete search history.

(56) References Cited

U.S. PATENT DOCUMENTS

| | | | |
|---|---|---|---|
| 8,155,335 B2 | 4/2012 | Rutschman | |
| 8,300,864 B2 | 10/2012 | Müllenborn et al. | |
| 8,442,248 B2 | 5/2013 | Solum | |
| 8,526,648 B2 | 9/2013 | Dijkstra et al. | |
| 8,565,456 B2* | 10/2013 | Nishizaki | H04R 25/43 381/122 |
| 8,706,038 B2 | 4/2014 | Sharma | |
| 8,712,083 B2 | 4/2014 | Solum | |
| 8,768,252 B2 | 7/2014 | Watson et al. | |
| 9,002,044 B2 | 4/2015 | Dinescu et al. | |
| 9,781,521 B2* | 10/2017 | Kofod-Hansen | H04R 25/305 |
| 2007/0037615 A1 | 2/2007 | Glezerman | |
| 2009/0197532 A1 | 8/2009 | Wyper | |
| 2011/0158441 A1 | 6/2011 | Batra | |
| 2012/0121095 A1 | 5/2012 | Popovski et al. | |
| 2012/0231732 A1 | 9/2012 | Kerselaers | |
| 2013/0108058 A1 | 5/2013 | Launer et al. | |
| 2014/0170979 A1* | 6/2014 | Samanta Singhar | G10L 25/60 455/41.2 |
| 2014/0193007 A1 | 7/2014 | Solum | |
| 2017/0134988 A1* | 5/2017 | Liu | H04W 28/18 |
| 2018/0176700 A1* | 6/2018 | Pedersen | H04R 25/552 |

FOREIGN PATENT DOCUMENTS

| | | |
|---|---|---|
| EP | 2 675 189 A1 | 12/2013 |
| WO | 2008/089784 A1 | 7/2008 |
| WO | 2014/086392 A1 | 6/2014 |
| WO | 2014/114818 A2 | 7/2014 |
| WO | 2014/114819 A2 | 7/2014 |

* cited by examiner

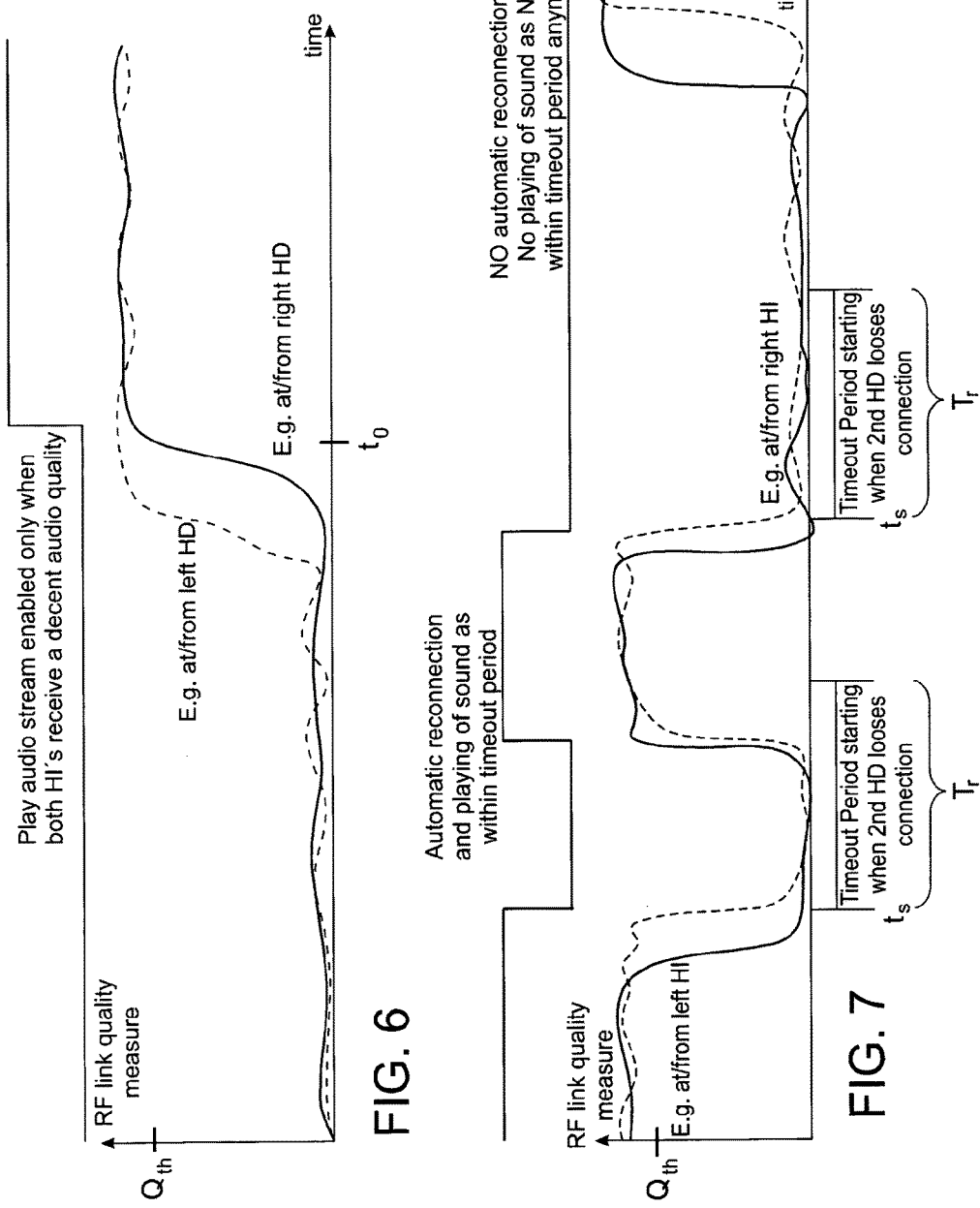

HEARING ASSISTANCE SYSTEM AND METHOD

BACKGROUND OF THE INVENTION

Field of the Invention

The invention relates to a hearing assistance system, comprising a first hearing device to be worn at a first one of a user's ears, and a second hearing device to be worn at a second one of the user's ears, each hearing device comprising an interface for receiving an external audio data stream from an external audio source device with the hearing devices being adapted to establish a binaural data link between the first hearing device and the second hearing device.

Description of Related Art

Typically, the link from and to such external audio source device, such as a phone device or an audio streamer like a TV-set, is a BLUETOOTH® (BT) link which, being in the 2.4 GHz ISM band, may suffer from multipath effects, interference from other unrelated BT or Wi-Fi links and highly varying link margins, e.g., due to head shadow effects (electromagnetic radiation at 2.4 GHz can penetrate human tissue only a few centimetres before being fully absorbed). Thus, use situations like having, e.g., a smartphone in a pocket or handbag on one side of the body, or not facing a TV set or moving around (e.g., grabbing some beer in the kitchen while the TV is switched on) may create conditions, where one hearing device receives signals of sufficient strength whereas the other one does not. Moreover, when multiple TV sets are on (e.g., one in the living room, one in the kitchen, one in the children's room and one in the neighbor's living room right behind a wall), it can easily happen that one hearing device receives the strongest signal from one TV set, whereas the other one receives it from another TV set. As the hearing devices are not paired to the neighbor's TV set, they will not be able to receive that TV set's (encrypted) audio, but unconditionally connecting to the strongest source will lead to a strange and unpredictable behavior, as physical distance to a source does not necessarily correlate with the signal strength of strongest source as well (as it usually would be for acoustic sources). As a result, one of the two hearing device may lose the audio connection whereas the other does not even within a close proximity, or one hearing device suddenly switches to a different source while the other does not, so that each ear receives different audio content. Generally, such behaviors are undesirable.

Moreover, audio source devices like TV sets or smart phones can transmit with higher power than hearing devices and may have more efficient transmission systems (better antennae due to fewer physical volume constraints). This results in an asymmetrical link condition, where BT communication, e.g., from a smartphone to a hearing device is possible, while the hearing device is not able to communicate to the smartphone.

When a wireless audio sink, such as a wireless hearing device, loses connectivity to an audio source, it may be configured to automatically reconnect to the audio source in case the audio source is still in range and the link loss is only of temporary nature. Link loss can happen, for example, due to head shadowing effects or localized interference. The benefit of an automatic reconnect is that the end user operating the audio sink does not need to intervene. However, the automatic reconnect comes at a cost, namely scanning for the presence of an audio source is power and time consuming. Furthermore, if the audio source is out of range, i.e., the link loss is permanent, the audio sink may expend a lot of energy trying to reconnect automatically.

U.S. Pat. No. 8,300,864 B2 relates to a binaural hearing aid system, wherein an audio stream from a telephone device is transmitted via a short range inductive link to one of the hearing aids and is forwarded via a second wireless link which is used by the hearing aids to exchange data to the other hearing aid.

U.S. Pat. No. 8,041,066 B2 relates to a binaural hearing aid system, wherein one of the two stereo channels received by one of the hearing aids via a wireless link is forwarded to the other hearing aid via a wireless link.

Other examples wherein an audio stream received via a BT link from an audio source is relayed to the other ear are described in U.S. Pat. Nos. 8,706,038 B2, 9,002,044 B2, and 8,155,335 B2. Also U.S. Patent Application Publication 2007/0037615 A1 relates to a system wherein an audio source, such as a mobile phone, sends an audio signal via a BT link to a hearing device which forwards the audio signal via a binaural link to the other hearing device.

U.S. Pat. No. 8,768,252 B2 relates to system wherein a Bluetooth audio source is connected via a Bluetooth link to a first loudspeaker for transmitting an audio signal to the first loudspeaker, and wherein a wireless link between the first loudspeaker and a second loudspeaker is used for forwarding audio data received from the audio source to the second loudspeaker.

U.S. Patent Application Publication 2013/0108058 A1 relates to two hearing devices connected via binaural link, wherein the quality of the binaural link is monitored in order to adjust the operation mode of each haring device according to the quality of the binaural link.

U.S. Patent Application Publication 2012/0231732 A1 relates to a system wherein an audio source sends an audio signal to two binaural hearing devices, with the hearing device having the better RSSI sending a baseband audio signal via an NFC link to the other hearing device.

U.S. Patent Application Publication 2009/0197532 A1 relates to a pair of earphones, wherein in a first mode one of the earphone receives an audio stream via a BT link from a mobile phone and relays it via a different wireless link to the other earphone, and wherein in a second mode the roles of the earphones are interchanged; switching between the two modes occurs according to the battery levels of the earphones in order to achieve balanced battery drain.

U.S. Patent Application Publication 2011/0158441 A1 relates to similar system comprising a pair of BT earphones, wherein the wireless link connecting the earphones is a BT link like the BT link via which the audio stream from the mobile phone is received; the roles of the earphones are switched according to the respective battery levels.

U.S. Pat. No. 8,526,648 B2 relates to a binaural hearing assistance system, wherein an audio signal from a wireless microphone is transmitted to the hearing devices, wherein the link quality to each hearing device is monitored, and wherein the signal received via the better link is relayed via a binaural link to the other hearing device.

U.S. Pat. No. 8,050,439 B2 relates to a binaural hearing system, wherein a bidirectional wireless link between the two hearing aids is used to exchange information concerning the battery charge status of each hearing aid in order to reduce power consumption of the hearing aid having the lower remaining battery lifetime once the difference of the remaining battery charges exceeds a certain limit.

U.S. Pat. No. 8,712,083 B2 relates to data logging in a wireless hearing aid system in order to modify link parameters in a manner to enhance reliability and link quality.

International Patent Application Publication WO 2014/114818 A2 relates to a binaural hearing system, wherein the scanning activity for an audio source in a carrier detect mode is distributed onto the two hearing devices in a coordinated manner for saving power; once one of the hearing devices detects an audio source, it notifies the other hearing device accordingly.

U.S. Patent Application Publication 2012/0121095 A1 relates to a binaural hearing system, wherein the two hearing devices alternate to send beacons to a mobile phone in order to prevent the mobile phone connection from losing connection with the hearing devices.

International Patent Application Publication WO 2014/114819 A2 relates to a binaural hearing system wherein an external device, such as a mobile phone, which is anyway connected to the hearing device scans for audio sources and notifies the hearing device when it detects an audio source.

U.S. Patent Application Publication 2014/0193007 A1 relates to a hearing system with activation/deactivation of audio streaming to a hearing device depending on the sensed motion of the hearing device user.

SUMMARY OF THE INVENTION

It is an object of the invention to provide for a binaural hearing assistance system which is able to transmit an external audio stream from an external audio source device to the hearing devices, wherein high quality of the received audio stream should be maintained for all use situations as far as possible.

It is a further object of the invention to provide for a binaural hearing assistance system which is able to transmit an external audio stream from an external audio source device, such as an as a phone device, to the hearing devices and to transmit audio signals of the user's voice captured by microphones of the hearing devices to the external device, wherein quality of the user's voice audio signal available at the external device should be optimized for all use situations.

It is a further object of the invention to provide for a binaural hearing assistance system which is able to transmit an external audio stream from an external audio source device, such as an as a phone device, to the hearing devices and to transmit audio signals of the user's voice captured by microphones of the hearing devices to the external device, wherein battery lifetime of the hearing devices should be maximized.

It is an object of the invention to provide for a binaural hearing assistance system which is able to transmit an external audio stream from an external audio source device to the hearing devices via wireless link, wherein power consumption in cases of loss of the link should be minimized.

It is a further object to provide for corresponding hearing assistance methods.

According to the invention, these objects are achieved by hearing assistance systems and hearing assistance methods as described herein.

One aspect of the invention is beneficial in that, by dynamically adjusting the coding of the audio stream transmitted by the external device according to the estimated quality of the links from the external device to the hearing devices, the quality of the audio stream as received by each of the hearing devices may be preserved, at least to some extent, by such audio coding adjustment also for use situations in which the at least one the links form the external device is weakened, e.g., due to head shadow effects.

According to one example, the dynamical audio coding adjustment includes transmitting the external audio data stream as a stereo stream when the estimated quality of both the link to the first hearing device and the link to the second hearing device is above a mono/stereo threshold and transmitting the external audio data stream as a down-mixed mono stream when the estimated quality of at least one the link to the first hearing device and the link to the second hearing device is below said mono/stereo threshold. Therewith, the required bit rate in the air can get reduced and interference effects with other, unrelated nearby BT or Wi-Fi links significantly mitigated. As a result, there are less lost data packets which would results otherwise in distortions of the decoded audio signal.

According to another example, the dynamical audio coding adjustment includes transmitting the external audio data stream with a coding at a first bit rate when the estimated quality of both the link to the first hearing device and the link to the second hearing device is above a high/low bit rate threshold and transmitting the external audio data stream with a coding at a second bit rate lower than the first bit rate when the estimated quality of at least one the link to the first hearing device and the link to the second hearing device is below said high/low bit rate threshold.

Another aspect of the invention is beneficial in that, by the system deciding, based on a link quality estimation, battery charge state estimation and/or microphone audio signal quality estimation, whether one of the hearing devices is to transmit its microphone audio signals via its interface to the external device and, if so, which one, that one of the microphones can be selected for capturing the user's voice which is the most appropriate one in the present use situation, e.g., that one providing for the best audio signal quality, such as for the best signal-to-noise ratio (SNR), or that one fitting best for balancing battery drain of the hearing devices.

A further feature of the invention is beneficial in that, by the hearing device communicating with each other via the binaural link so as to alternate transmission of their respective microphone audio signal via their interface to the external device, battery drain of the two hearing devices can be balanced, thereby enhancing battery lifetime of the overall system.

Yet another feature of the invention is beneficial in that, by a hearing device having lost its connection to the external device entering a first scanning mode for reconnecting to the external device if it was informed that the other hearing device is still connected to the external device and entering a second scanning mode for reconnecting to the external device if it was informed that the other hearing device likewise is not connected to the external device, energy consumption required for reconnecting a hearing device in case of link loss to the external device may be minimized.

The link to between the external device and the hearing devices typically is a BT link, preferably BT Low Energy.

Hereinafter, examples of the invention will described with reference to the accompanying drawings.

BRIEF DESCRIPTION OF THE DRAWINGS

FIGS. 3A1 to 3D schematic illustrate examples of various configurations/use situations for a hearing assistance system according to the invention;

FIG. 6 is an example of the quality of the links to the hearing devices as a function of time;

FIG. 7 is another example of the quality of the links to the hearing devices as a function of time;

DETAILED DESCRIPTION OF THE INVENTION

Figure 1:
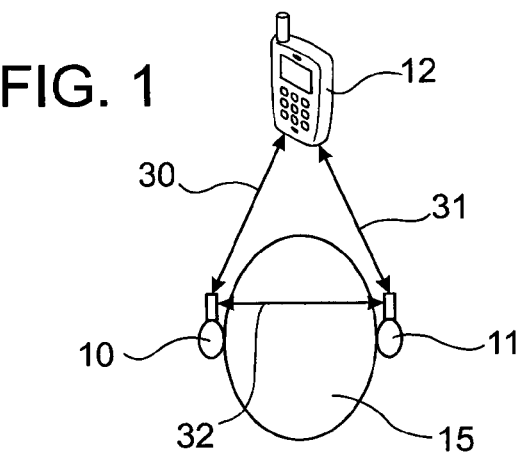
FIG. 1 schematically represents an example of a hearing assistance system of the invention, in which a phone device exchanging audio signals with two hearing devices.

Hereinafter "hearing devices" are meant to include all kinds of ear level audio devices, such as hearing aids in different form factors, cochlear implants, wireless ear buds, headsets or other such devices. The "external device" may be an audio source like a remote microphone, lapel microphone, phone, smart eyeglasses, tablets, televisions, etc. Such devices may incorporate for their normal function at least one of microphone(s), speakers, user interface, amplification for, e.g., hearing loss compensation, sound level limiters, noise cancelling, feedback cancelling, beamforming, frequency compression, logging of environmental and/or user control data, classification of the ambient sound scene, sound generators and/or other such functions, which may get influenced by the inventive functionality as described here or which may influence the inventive function FIG. 1 is a schematic representation of an example of a hearing assistance system according to the invention, comprising a first hearing device 10 to be worn at one ear of a user, a second hearing device 11 to be worn at the other ear of the user and an external device 12, wherein the first and second hearing devices 10, 11 may communicate with each other via a binaural link 32 and with the external device 12 via a link 30 and 31, respectively.

Figure 2:
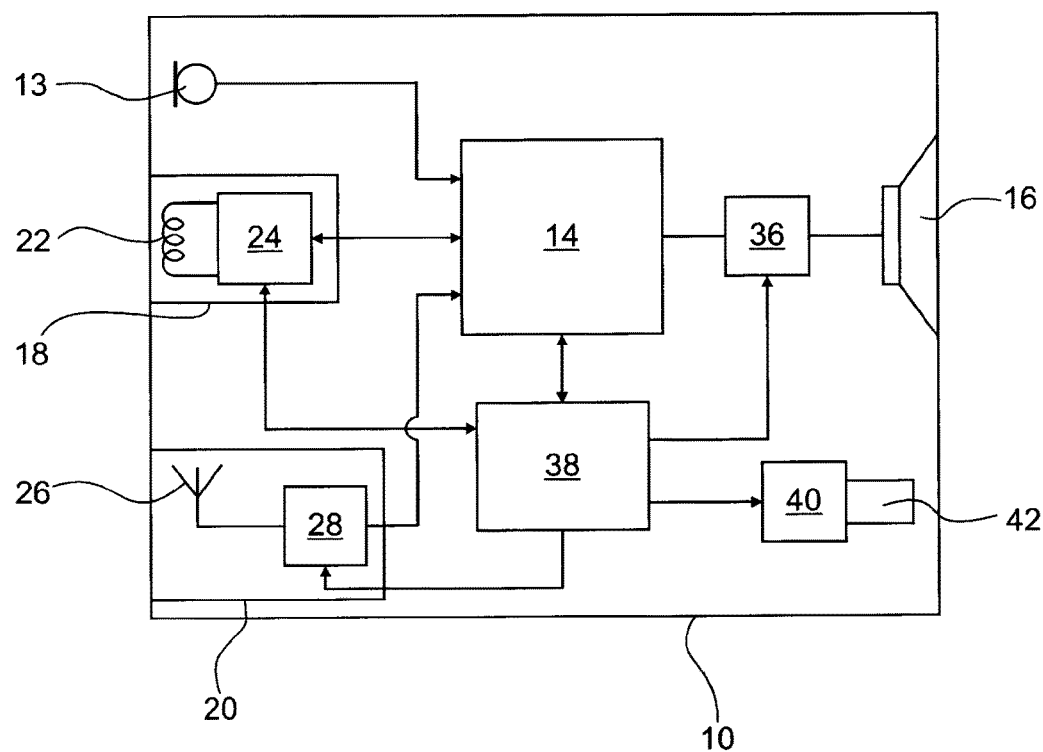
FIG. 2 is a block diagram of an example of a hearing device to be used in a hearing assistance system according to the invention.

FIG. 2 is a block diagram of an example of a hearing device 10 forming part of a hearing assistance system according to the invention as shown in FIG. 1, wherein one such device 10 is to be worn at a first ear of a user for stimulating the first ear and a second one of such device is to be worn at the other ear of the user for stimulating the other ear (the two devices are designated by 10 and 11 in FIG. 1).

Preferably, the hearing device 10 is a hearing instrument, such as a BTE (behind-the-ear), ITE (in-the-ear) or CIC (completely-in-the-channel) hearing aid. However, the hearing devices, for example, also could be an auditory prosthesis, such as a cochlear implant device. According to another example, the hearing devices could form a headset or headphones for a normal hearing person.

According to the example of FIG. 2, the hearing device 10 is an electro-acoustic hearing aid comprising a microphone arrangement 13 for capturing audio signals from ambient sound, an audio signal processing unit 14 for processing the captured audio signals and an electro-acoustic output transducer (loudspeaker) 16 for stimulation the user's hearing according to the processed audio signals.

The hearing instrument 10 also comprises a first wireless interface 18 and a second wireless interface 20. Typically, the first interface 18 is designed for a shorter range and a lower power consumption than the second interface 20; accordingly. The first interface 18 comprises an antenna 22 and a transceiver 24, and the second interface comprises an antenna 26 and a transceiver 28.

The first interface 18 is provided for enabling wireless data exchange between the first hearing instrument 10 and the second hearing instrument 11 via a wireless link 32 which preferably is an inductive link which may operate, for example, in a frequency range of 6.765 MHz to 13.567 MHz, such as at 10.6 MHz. However, rather than being implemented as an inductive link, the wireless link 30 also could be far-field link typically requiring a lower power consumption than the link of the second interface 20, such as a power optimized proprietary digitally modulated link operating in the 2.4 GHz ISM band. According to further, less preferred alternative the binaural link 32 even may be a wired link, such as a CROS (Contralateral Routing of Signal) link.

In particular, the first interface 18 may be designed to form part of a hearing instrument body area network (HIBAN). In particular, the hearing instruments 10 and 11 may exchange audio data and/or parameter settings/commands required for binaural operation of the two hearing instruments 10, 11, for example, in a master-slave configuration.

The second interface 20 is provided for exchanging data via the link 30, 31 with the external device 12. Preferably, the link 30, 31 is Bluetooth link; in particular, it may use the BLUETOOTH® Low Energy standard.

In case that the binaural link 32 is a wireless link, the protocol/interface for the binaural link 32 and the BT links 30, 31 may be the same (in this case the interface 20 used for the binaural link 32 also could be used for data reception from the external device 12 via the links 30, 31) or it may be different (requiring two separate interfaces 18, 20 for the links 32 and 30/31, respectively).

Figure 4:
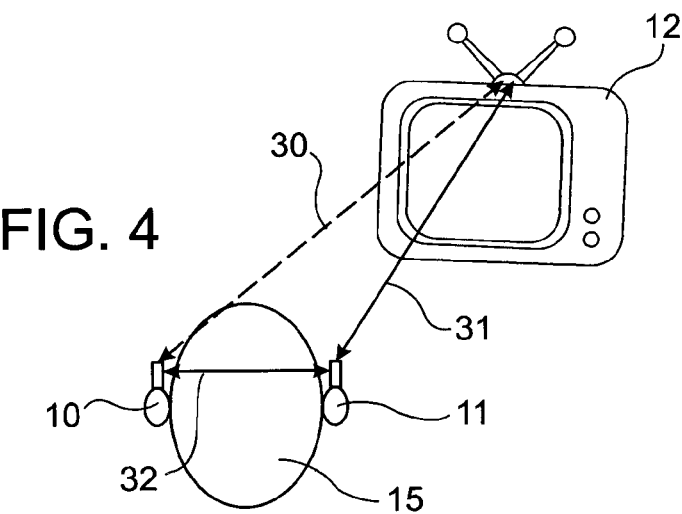
FIG. 4 is a schematic representation of another example of a hearing assistance system according to the invention wherein a stereo audio signal is streamed from an audio source to the hearing devices.
Figure 5:
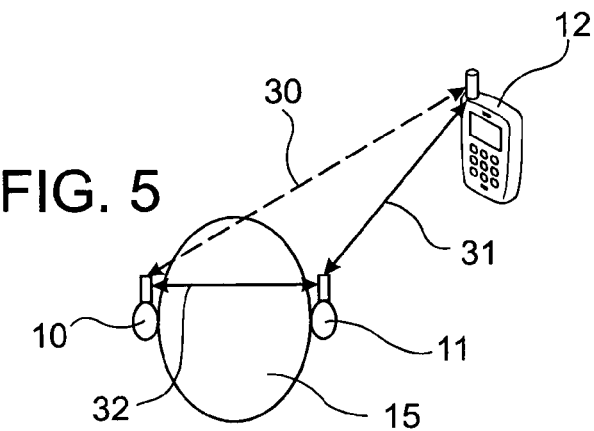
FIG. 5 is a schematic representation of a use situation of the system of FIG. 1 wherein one of the links is disrupted due to a head shadow effect.

Preferably, the external data stream is an audio data stream which may be a mono stream or a stereo stream. The external device 12 typically is a phone device, such as a mobile phone (as illustrated in FIGS. 1 and 5), a DECT phone device (Digital Enhanced Cordless Technology cordless phone that works with a landline) or an Internet phone device ("Voice over IP"). Alternatively, it may be another type of electronic media/communication device, such as a personal computer, a tablet computer, a radio device, a music/media player, a HiFi set, a TV set (as illustrated in FIG. 4), a wireless microphone or a generic remote control. According to a further alternative, it may be a public address/announcement system (like in an airport or a place of worship).

The hearing instrument 10 also may comprise a controller 38 for controlling operation of the hearing instrument 10, with the controller 38 acting on the signal processing unit 14, the transceivers 24 and 28.

The hearing instrument 10 also may comprise a unit 40 for determining the charging status of the battery 42 of the hearing instrument 10, which provides a corresponding battery charge status signal to the controller 38.

Figure 3:
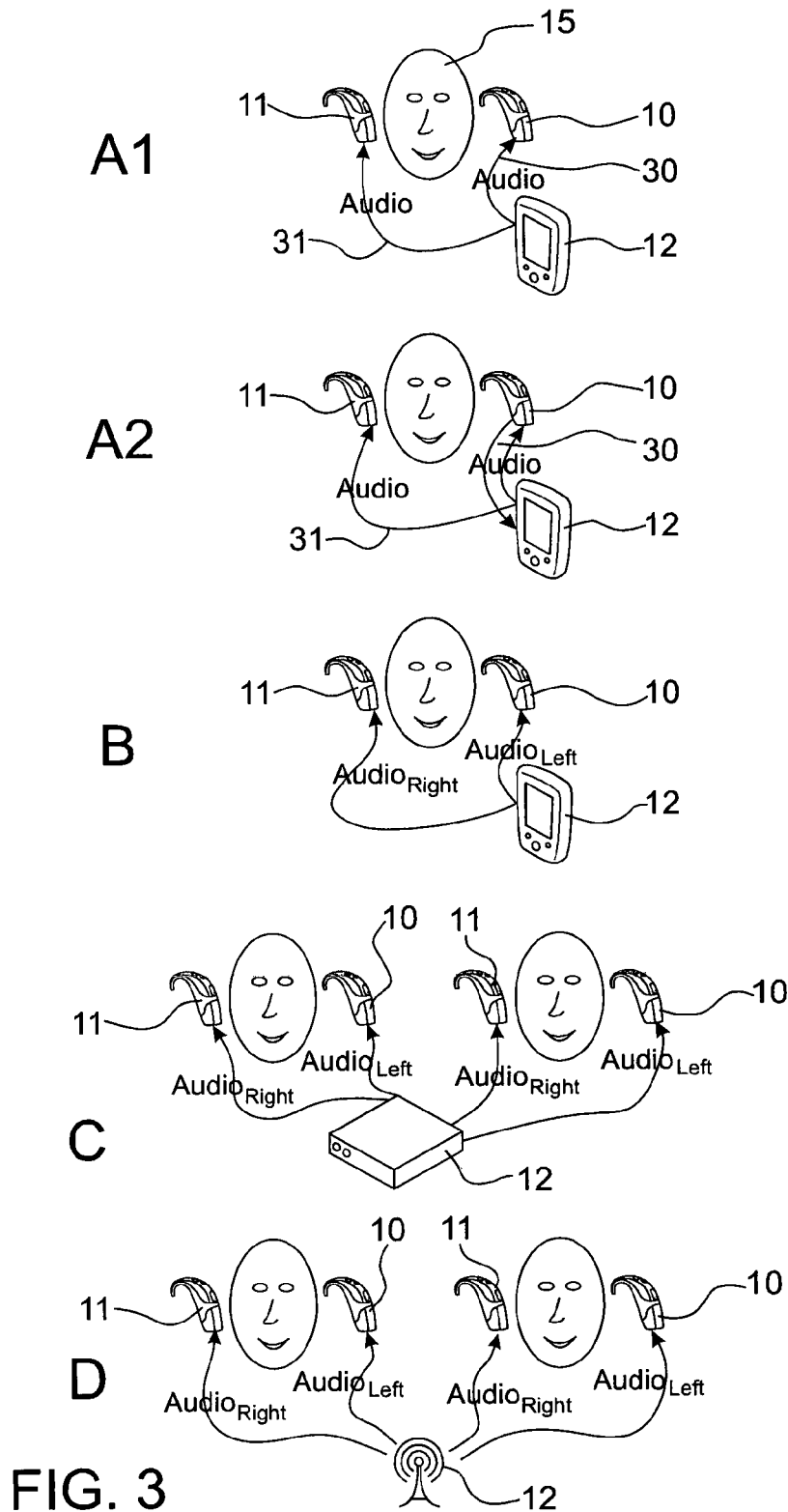

FIG. 3 is a schematic illustration of various configurations or use situations for a hearing assistance system according to the invention. Example A1 corresponds to the configuration of FIG. 1, wherein the external device 12 is a phone device used with the hearing devices 10, 11 in such a manner that the mono audio signal received by the phone device 12 from the phone network is transmitted via the links 30, 31 as a mono signal to the hearing devices 10, 11, with the microphone (not shown) of the phone device 12 being used for capturing the voice of the user 15 of the hearing devices 10, 11.

Example A2 shows a configuration similar to that of example A1, wherein, however, instead of the microphone of the phone device 12 being used for capturing the user's voice, the user's voice is captured by the microphones 13 of the hearing devices 10, 11, and the resulting microphone audio signals are transmitted from at least one of the hearing devices 10, 11 via the respective link 30, 31 as a mono signal to the phone device 12. Such a configuration may increase the SNR (signal-to-noise-ratio) of the audio signal corresponding to the user's voice, as will be explained later in more detail.

Example B shows a configuration, in which a stereo audio signal is transmitted from the external device 12 to the hearing devices 10, 11, i.e., the left channel is transmitted via the link 30 to the hearing device 10 worn at the left ear, and the right ear channel is transmitted via the link 31 to the hearing device 11 worn at the right ear. In such cases, the external device may be, for example, a smartphone, a tablet computer, a personal media player or a TV set.

Example C shows a multi-user configuration, wherein a stereo audio stream is provided from the external device 12 to several users, each of whom is wearing a pair of hearing devices 10, 11, thereby extending the principle of use case B to several users. In such a case, the external device 12 may be, for example, a TV set shared by several people.

Example D shows a configuration similar to example C, wherein a stereo audio signal is broadcast from an audio source device 12 to hearing devices 10, 11 of several users in the broadcast area. The audio source device 12, in such cases, may be a public address (PA) system, for example, at an airport, a train station or at a place of worship.

FIG. 4 is a further illustration of the configuration of example B of FIG. 3, wherein a stereo audio signal is transmitted from a stereo audio source, such as a TV set 12, via the links 30, 31 to the left ear hearing device 10 and the right ear hearing device 11, respectively. As already mentioned above, an RF link may be weakened or interrupted, for example, due to head shadow effects; in FIG. 4, an example is illustrated, wherein the link 30 between the external device 12 and the left ear hearing device 10 is weakened or interrupted, as indicated by dashed lines due to head shadow effects.

In order to enable the hearing assistance system to take appropriate actions in such case, in particular in order to maintain high quality of the audio stream received by the hearing devices 10, 11 as far as possible, the hearing assistance system may estimate the quality of at least one of the links 30, 31 from the external device 12 to the hearing devices 10, 11, and the system then may dynamically adjust the coding of the audio stream transmitted by the external device 12 according to the estimated quality of at least one of the links 30, 31 from the external device 12 to the hearing devices 10, 11.

Preferably, the quality of both links 30, 31 is estimated and taken into account for dynamically adjusting the audio stream coding. Typically, the hearing devices 10, 11 and the external device 12 communicate via the links 30, 31 and 32 with each other in order to negotiate such dynamical audio coding adjustment so as to ensure that the audio coding is adjusted by the external device 12 in such a manner that the adjusted coding complies with the decoding abilities of the devices 10, 11.

For example, each hearing device 10, 11 may estimate the quality of the link 30, 31 from the external device 12 to the respective hearing device 10, 11, and also the external device 12 may estimate the quality of the link 30, 31 to each hearing device 10, 11, with the hearing devices 10, 11 and the external device 12 exchanging their link quality estimates with each other in order to commonly decide when and how the coding of the audio stream should be adjusted.

According to an alternative example, the external device 12 may estimate the quality of the links 30, 31 on its own and may decide on its own that and how the coding of the audio stream should be adjusted. According to one example, the external device 12, when detecting that the quality of the link 30, 31 to one of the hearing devices 10, 11 falls below a threshold, may notify the other one of the hearing devices 10, 11 by sending a corresponding message to that one of the hearing devices 10, 11.

According to another alternative example, each hearing device 10, 11 may estimate the quality of the respective link 30, 31 from the external device 12 to the respective hearing device 10, 11, with the hearing devices 10, 11 communicating via the binaural link 32 with each other in a manner so as to commonly decide on when and how the coding of the audio stream should be adjusted.

Preferably, the quality of the links 30, 31 from the external device to the hearing devices 10, 11 is estimated by monitoring at least one parameter indicative of the link quality. For example, the parameter may be an RSSI (received signal strength indicator) value of a signal received by the external device 12 from the respective hearing device 10, 11, an RSSI value of a signal received by the respective hearing device 10, 11 from the external device 12, or a combination of such RSSI values. According to another example, such link quality parameter may be a likelihood of the external device 12 for receiving an acknowledgement packet ("ACK") from the respective hearing device 10, 11. Alternatively or in addition, the link quality parameter may be a bit error rate or a frame error rate of the transmitted data as received either by the external device 12 or the hearing device 10, 11.

There are several options of how the audio coding may be adjusted. According to one example, the dynamical audio coding adjustment includes switching from a "stereo mode" to a "mono mode" in case of low link quality, i.e., the external audio data stream is transmitted as a stereo stream as long as the estimated quality of both the link 30 to the hearing device 10 and the link 31 to the hearing device 11 is above a certain mono/stereo threshold, whereas the external audio data stream is transmitted as a down-mixed mono stream when the estimated quality of at least one of the links 30, 31 is below such mono/stereo threshold. In such case, according to a first variant, the mono stream may be transmitted to both hearing devices 10, 11; alternatively, the mono stream may be transmitted to that one of the hearing devices 10, 11 for which the higher link quality is estimated, with that hearing device 10, 11 relaying the received mono audio stream via the binaural link to the other one of the hearing devices.

In the example illustrated in FIG. 4, the quality of the link 30 to the left ear hearing device 10 is below the mono/stereo threshold, so that the stereo audio signal available in the audio source 12 is down-mixed to a mono signal which then is transmitted via the link 31 to the right ear hearing device 11 which may relay the mono stream via the binaural link 32 to the left ear hearing device 10 in case that the link 30 is too weak for transmitting the down-mixed mono stream to the left ear hearing device 10.

Alternatively or in addition to the above described mono down-mixing of the stereo signal the dynamical audio coding adjustment may include reducing the bit rate of the coding of the audio data stream with decreasing estimated quality of at least one of the links 30, 31 to the hearing devices 10, 11. For example, the external audio data stream may be transmitted with a coding at a first bit rate as long as the estimated quality of both the link 30 to the hearing device 10 and the link 31 to the hearing device 11 is above a high/low bit rate threshold, and it may be transmitted with a coding at a second bit rate lower than the first bit rate when the estimated quality of at least one of the links 30, 31 is below such high/low bit rate threshold. In such case, according to one variant, the audio stream with a coding at the second bit rate may be transmitted to both hearing devices 10, 11, and according to an alternative variant, the audio stream with a coding at the second bit rate may be transmitted only to that one of the hearing devices 10, 11 having the higher estimated link quality (in the example of FIG. 4 this would be the right ear hearing device 11), with that hearing device relaying the received audio stream via the binaural link 32 to the other one of the hearing devices (in the example of FIG. 4, this would be the left ear hearing device 10).

Reducing the coding bit rate may increase the quality of the received audio signal in case that a low quality of a link is due to "data congestion", with such congestion being reduced due to the reduced bit rate. In such cases of data congestion the overall audio quality may be improved by reducing the coding bit rate, although a reduced coding bit rate as such would tend to reduce audio quality.

In general, the concept of dynamically adjusting the coding of the audio stream transmitted from the external audio source device 12 according to the estimated link quality is particularly useful for hearing assistance systems comprising only a single pair of binaural hearing devices 10, 11 (such as in the configuration B of FIG. 3).

The concept of dynamic audio coding adjustment according to the estimated link quality may be applied also to the binaural link 32 which typically is used not only for communication between the hearing devices 10, 11 (such as with regard to the present hearing program setting or the presently determined auditory scene) but also for audio signal transmission from one ear to the other. In such case, the coding of the audio stream transmitted from one of the hearing devices 10, 11 via the binaural links 32 to the other one of the hearing devices may be dynamically adjusted according to the estimated quality of the binaural link 32. For example, the rate at which the audio signal is coded may be adjusted according to the estimated link quality, such as by reducing the bit rate with decreasing quality of the binaural link 32; in particular, the bit rate of the coding may be reduced from a higher first value to a lower second value when the estimated link quality falls below a high/low bit rate threshold.

According to another example, the "quality of service" of the audio signal presented to the user 15 by the hearing devices 10, 11 may be ensured by the hearing devices 10, 11 communicating with each other in such a manner that both hearing devices 10, 11 jointly decide to start to stimulate the respective ear according to the received audio data stream only once the estimated link quality is above a given threshold value for both the link 30 from the external device 12 to the hearing device 10 and the link 31 from the external device 12 to the hearing device 11 (in case that one of the hearing devices 10, 11 receives the audio signal not directly from the external device 12 but rather via relaying through the other hearing device via the binaural link 32, the quality of the link 30 or 31 from the external device to the hearing device relaying the audio signal to the other hearing device and the quality of the binaural link 32 would have to be above a quality threshold before the hearing devices 10, 11 start to stimulate the respective ear).

An example of such a situation is illustrated in FIG. 6 which shows the quality of both the link 30 and the link 31 as a function of time, wherein playing of the audio stream is started by both hearing devices at a time $t_0$ when the link quality of both links is above the required threshold $Q_{th}$.

Such a "quality of service" concept may be applied also to the automatic reconnection action of the hearing devices once they lost the connection to the external device 12, as illustrated in FIG. 7. For example, the hearing devices 10, 11 may automatically try to reconnect to the external device 12 within a given timeout period $T_r$ after loss of the connection, with the hearing devices 10, 11 communicating loss of connection with the external device 12 to the other hearing device 10, 11, with the timeout period starting after the time when both hearing devices have lost their connection to the external device 12 (in the example of FIG. 7, the times when the timeout period starts are indicated at $t_s$). Typically, the timeout period $T_r$ may have a duration of 1 min to 30 min. In the example of FIG. 7, successful automatic reconnection to the external device 12 occurs within the first timeout period $T_r$, whereas it does not occur in the second timeout period $T_r$, so that in the first timeout period the hearing devices 10, 11 resume playing of the received audio signals, whereas they do not resume playing of the received audio signals in and after the second timeout period.

As already mentioned with regard to example A2 of FIG. 3, the links 30, 31 between the external device 12 and the hearing device 10, 11 may be used also for transmitting microphone audio signals captured by the hearing device 10, 11 to the external device 12, in particular when the external device 12 is a phone device. However, also in this case the hearing assistance system has to deal with situations in which at least one of the links 30, 31 is weakened or interrupted, for example due to head shadow effects as indicated by the dashed line of link 30 in FIG. 5.

A hearing assistance system comprising a phone device 12 and binaural hearing devices 10, 11 comprises at least three microphones, namely a first microphone arrangement 13 of the left ear hearing device 10, a microphone arrangement 13 of the right ear hearing device 11 and a microphone arrangement (not shown) of the phone device 12, wherein, however, each of the microphone arrangements may consist of more than one microphone in order to enable acoustic beamforming, with each of the microphone arrangements in principle being adapted to capture the voice of the user 15. For optimizing the performance of the hearing assistance system with regard to pick-up of the voice of the user 15 the hearing assistance system may decide which of the available microphones should be presently used for capturing the voice audio signal which then is finally utilized by the phone device 12 for transmission via the phone network.

According to a first example, such decision is taken based on the estimated quality of the links 30, 31 (examples of how the link quality may be estimated have been explained above with regard to the dynamic audio coding adjustment). For example, the hearing device 10, 11 having the higher estimated link quality may be selected for transmitting its microphone audio signal to the phone device 12 (in the example of FIG. 5, this would be the right ear hearing device 11). Further, in case that the estimated link quality is below a given threshold for both hearing devices 10, 11, it may be decided that none of the hearing devices transmits its microphone audio signal to the phone device 12, with the microphone of the phone device 12 then being used as the only microphone for capturing the user's voice.

Further, similar to the audio coding adjustment of the audio signal transmitted from the external device as discussed above, the coding of the microphone audio signals transmitted by the hearing devices 10, 11 to the phone device 12 may be dynamically adjusted according to the estimated link quality. For example, the bit rate of the coding of the microphone audio signal stream may be reduced with decreasing estimated link quality. In particular, the microphone audio signal stream may be coded at a first bit rate when the estimated link quality is above a high/low bit rate threshold, and it may be transmitted with a coding at a second bit rate lower than the first bit rate when the estimated link quality is below such high/low bit rate threshold.

Another parameter that may be taken into account when deciding on the question of which of the microphone signals should be used by the phone device 12 is the battery charge state of the hearing devices 10, 11, as obtained, for example by the unit 40. For example, the battery charge state may be estimated by repeatedly measuring the battery voltage. According to one example, the hearing device 10, 11 having the better estimated battery charge state may be selected for transmitting its microphone audio signal to the external device 12, thereby ensuring that battery drain due to the transmission of the microphone audio signal can be balanced in order to enhance the overall battery lifetime of the system. Moreover, in case that the estimated battery charge state is below a given threshold for both hearing devices 10, 11, it may be decided that none of the hearing devices 10, 11 transmits its microphone audio signal to the phone device 12, with only the signal of the microphone of the phone device 12 in this case being used.

According to one example, only one of the parameters link quality and battery charge state may be used for deciding which of the microphones is to be used. Alternatively, both parameters link quality and battery charge state may be used for such decision. For example, it may be decided, in case that the estimated qualities of the links 30, 31 are within a given range, that the hearing device having the better estimated battery charge state is selected for transmitting its microphone audio signal to the phone device 12. According to another example, it may be decided, in case that the estimated battery charge states of the hearing devices 10, 11 are within a given range, that the hearing device having the better estimated link quality is selected for transmitting its microphone audio signal to the phone device 12.

Similarly, the battery charge state also may be taken into account when deciding on dynamical adjustment of the coding of the microphone audio signals. For example, the bit rate of the coding of the microphone audio signals may be reduced with decreasing estimated battery charge state.

A further parameter that may be taken into account when deciding on the question of which of the microphone signals should be used by the phone device 12 is the quality of the audio signal captured by the hearing device microphones and optionally also the quality of audio signal captured by the microphone of the phone device 12 may be taken into account when deciding on which of the microphone signals is to be used by the phone device 12. For example, the device having the highest audio signal quality may be selected for providing its microphone audio signal to the phone device 12. In case that the device having the highest audio signal quality is one of the hearing devices 10, 11, that hearing device will transmit its microphone audio signal to the phone device 12; in case that the microphone signal captured by the microphone of the phone device 12 has the highest audio signal quality, it may be decided to use that microphone audio signal, so that none of the hearing devices 10, 11 has to transmit its microphone audio signal to the phone device 12.

As in the case of the link quality and the battery charge state, respectively, the quality of the microphone audio signals may be used as the single criterion to be taken into account when deciding on which one of the microphone signals is to be used by the phone device 12; alternatively, the quality of the microphone audio signals may be used in combination with either the battery charge state or the link quality or in combination with both the battery charge state and the link quality.

For example, in case that the estimated qualities of the links 30, 31 between the hearing devices 10, 11 and the external device 12 are within a given range and the estimated battery charge states of the hearing devices 10, 11 are within a given range, the hearing device having the better estimated audio signal quality may be selected for microphone audio signal transmission to the external device 12.

Preferably, the quality of the microphone audio signals may be estimated by determining the SNR of the respective microphone audio signal.

According to one example, the phone device 12 may request a decision concerning transmission of a microphone audio signal from the hearing devices 10, 11 to the phone device 12 during a phone call, in particular at the beginning of the phone call.

According to one example, the link qualities are estimated only by the hearing devices 10, 11, and the estimated link qualities (and, if applicable, the estimated battery charge states and/or the estimated SNR) are exchanged between the hearing devices; according to one variant, in that decision then only the hearing devices 10, 11 may be involved.

According to an alternative example, the link qualities may be estimated by both the hearing devices and the phone device 12, wherein the estimated link qualities (and, if applicable, the estimated battery charge states and/or the estimated SNR) are communicated between the hearing devices 10, 11 and the phone device 12, with both the hearing devices 10, 11 and the phone device 12 being involved in the decision concerning the transmission of the microphone audio signals to the phone device 12.

While it is usually preferred—for avoiding excessive battery drain—to have only one of the hearing devices 10, 11 transmit its microphone audio signal to the phone device 12, there may also be cases in which it is desirable that the phone device 12 receives the microphone audio signal from both hearing devices 10, 11; in such case, the microphone audio signals of the two hearing devices 10, 11 may be mixed at the phone device 12 (this mixed signal, or the microphone audio signal of one of the hearing devices 10, 11, also may be mixed with the microphone audio signal obtained by the microphone of the hearing device 12).

The power consumption of each hearing device 10, 11 can be reduced by moving the microphone signal streaming task to the other hearing device (or by using the phone device microphone only) and by reducing the bit rate of the microphone signal coding (a lower bit rate uses less air time). As already mentioned above, lowering the bit rate of the codec—in addition to reducing the required air time and thus power consumption—may also improve the audio quality in case that audio quality degradations were due to packet losses (collisions) in the air from another unrelated data stream, such as from another BLUETOOTH® stream or from a WiFi signal.

According to another approach, battery drain of the hearing devices may be balanced by distributing the microphone audio signal streaming task onto the two hearing devices according to an appropriate scheme, thereby increasing total battery lifetime of the binaural system. According to this approach, the hearing devices 10, 11 may communicate with each other via a binaural link 32 so as to alternate transmission of their respective microphone audio signal. When the phone device 12 receives or initiates a phone call, it may request transmission of a microphone audio signal from the hearing devices 10, 11, with the hearing devices 10, 11 then deciding for each phone call which one of the hearing devices will transmit its microphone audio signal to the phone device 12 during that phone call.

It is to be noted that such a microphone signal transmission role alternation does not require estimating or measuring the battery charge state and as such is particularly simple.

According to one example, the hearing device 10, 11 transmitting its microphone audio signal to the phone device 12 during the present phone call may send a message to the other hearing device 11, 10 via the binaural link 32 requesting the other hearing device to transmit its microphone audio signal to the phone device 12 during the next phone call.

While this procedure is particularly simple, it is not very effective in case that the duration of the phone calls varies strongly. For such cases a more accurate balancing of the battery drain may be achieved by taking into account the duration of each phone call for deciding when to alternate the microphone audio signal transmission task in such a manner that the total microphone audio signal transmission time is about the same for both hearing devices. For example, if the left ear hearing device 10 transmits its microphone audio signal during a lengthy phone call, thereafter the right ear hearing device 11 may transmit its microphone audio signal during two subsequent short phone calls.

According to an alternative example, the hearing devices 10, 11 may negotiate a scheme determining which one of the hearing devices will transmit its microphone audio signal to the phone device 12 for each phone call as a function of a number assigned to the respective phone call. The hearing devices 10, 11 synchronize at least once by respective message exchange with regard to the number of the last phone call and then consecutively count the number of phone calls in order to identify the number assigned to the present phone call, with the hearing devices preferably re-synchronizing regularly with regard to the number of the last phone call; in a refined version, the scheme may take into account the length of the phone calls, e.g., the scheme may be dynamically updated according to the length of the phone calls made so far.

According to an alternative approach, rather than having the hearing devices 10, 11 decide on the question of which hearing device should take the microphone signal transmission task for the next phone call, the phone device 12 may decide alone, based upon its call statistics, which one of the hearing devices 10, 11 should transmit its microphone signal during the next phone call in order to ensure balancing of the use time and the battery drain.

Another approach relates to a procedure for minimizing the power consumption of the hearing devices 10, 11 in cases where the link to the external device 12 is lost, wherein a hearing device 10, 11, in case that it detects loss of its connection with the external device 12, obtains information from the other hearing device 11, 10 as to whether the other device 11, 10 is still connected to the external device 12, with the hearing device having lost its connection with the external device 12 entering a first scanning mode for reconnecting to the external device 12 if the other hearing device 11, 10 is still connected to the external device and entering a second scanning mode for reconnecting to the external device 12 if the other hearing device 11, 10 has also lost connection with the external device 12, wherein at least one parameter of the scanning process is different in the second scanning mode compared to the first scanning mode.

By selecting a different scanning mode as a consequence of whether the other device likewise has lost its connection to the external device 12 or not, the scanning process for reconnecting to the external device 12 can be optimized with regard to the total power consumption (e.g., by selecting a lower power consuming scanning mode if both hearing devices have lost the connection); further, the battery drain due to the scanning process may be balanced between the hearing devices 10, 11 (e.g., by selecting a scanning mode with the alternating scanning action if both hearing devices have lost the connection.

As will be explained below in more detail, the at least one parameter of the scanning process which is different in the second scanning mode as compared to the first scanning mode, may include the decision of whether the respective hearing device scans alone or in coordination with the other hearing device, the scanning rate, the scanning duration, the variation of the scanning rate, etc.

According to one example, the hearing device 10, 11 having lost its connection to the external device 12 may send a request to the other hearing device 11, 10 via the binaural link 32 to obtain information as to whether the other hearing device 11, 10 is still connected to the external device 12 or not (i.e., a "pull message" is used). According to an alternative example, each hearing device 11, 10 sends, once it detects loss of its connection with the external device 12, a message to the other hearing device 11, 10 indicating that it has lost its connection to the external device 12 (i.e., a "push message" is used).

According to one example, in the first scanning mode the hearing device 10, 11 scans on its own at a first scanning rate which, for example, may be constant.

In the second scanning mode, the hearing device 10, 11 may scan in a manner coordinated with the other hearing device 11, 10. Preferably, each hearing device 10, 11 notifies the other hearing device 11, 10 once it has detected the external device 12 upon its scanning action in the first or second scanning mode.

Preferably, each hearing device 10, 11 scans, in the second scanning mode, at a scanning rate and/or duration which is reduced with increasing time since the beginning of the scanning action. The reason for this strategy is that scanning for an external device 12 is a power-hungry activity, and with increasing duration of failure to reconnect to the external device 12 it is less likely that reconnection will be possible within a given time interval.

According to an alternative example, each hearing device 10, 11 may scan in the second scanning mode in a cyclic manner, wherein in each cycle an initially high scanning rate and/or duration is reduced with increasing time from the beginning of the cycle to the end of the cycle. While in the first scanning mode only the hearing device 10, 11 having lost its connection to the external device 12 will scan, in the second scanning mode both hearing devices 10, 11 may scan independently (while, however, notifying the other hearing device when the audio source 12 is detected), or they may scan in a coordinated (distributed) fashion. In the latter case, for example, the scanning cycles of the two hearing devices 10, 11 may be phase-shifted in such a manner that at a time one of the hearing devices 10, 11 is in the first part of the cycle with the relatively higher scanning rates, while the other hearing device 11, 10 is in the second part of the cycle with the relatively lower scanning rates and/or duration, and vice versa.

When scanning in a coordinated fashion in the second scanning mode, the hearing devices 10, 11 may distribute the scanning process onto both hearing devices 10, 11 in an alternating manner wherein at least for some time only one of the devices is scanning whereas the other one is resting and vice versa. For example, at any time, only one of the hearing devices is scanning whereas the other one is resting and vice versa (i.e., in such case there would be no overlap of the scanning activities of the two hearing devices).

Figure 8:
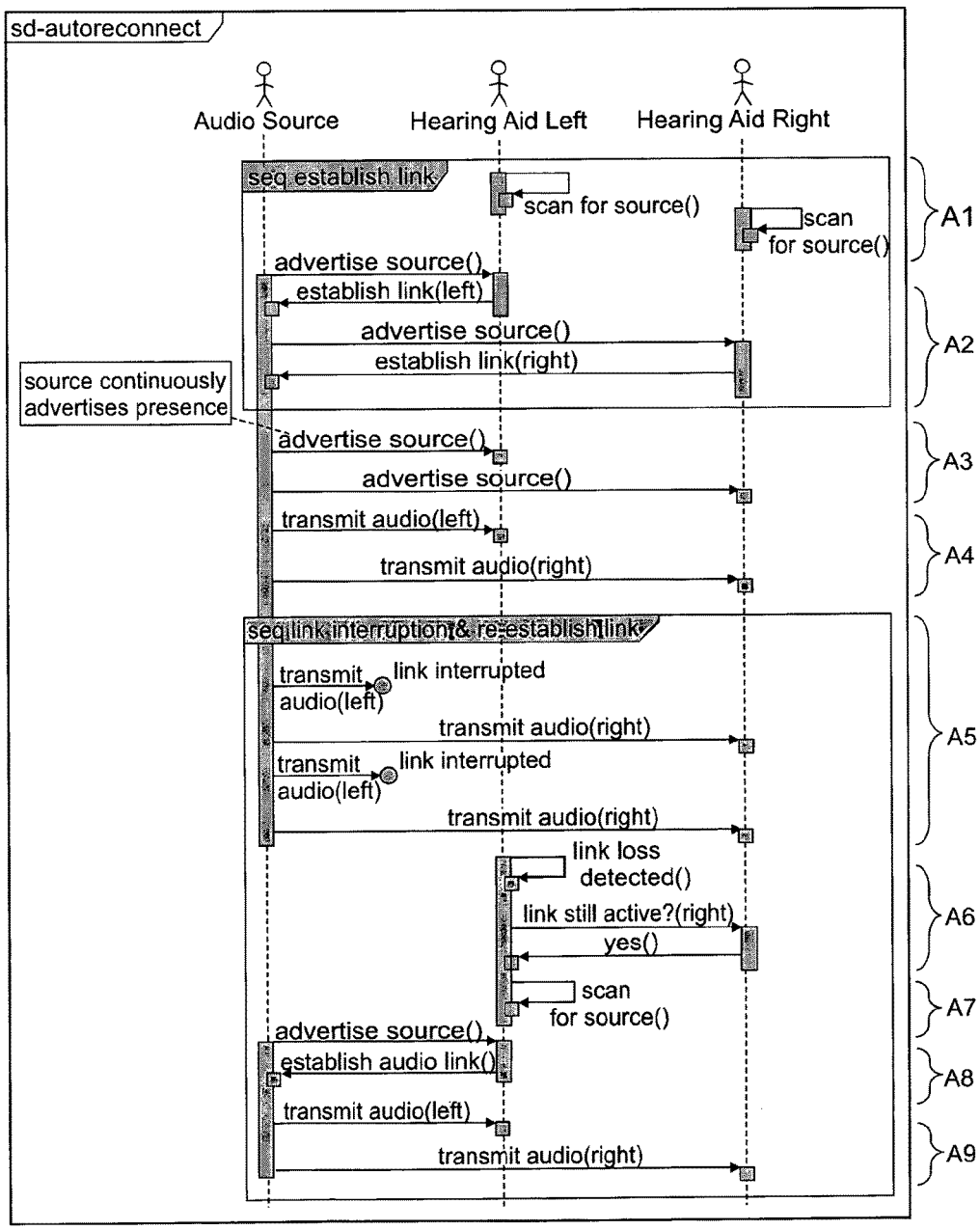
FIG. 8 is a message sequence chart of an example of a process for connecting the external device and the hearing devices of a hearing assistance system according to the invention and for reconnecting one of the hearing devices and the external device after a connection loss of that hearing device.

FIG. 8 is a message sequence chart of an example of a process for connecting the external device 12 and the hearing devices 10, 11 (upper part of FIG. 8) and for reconnecting one of the hearing devices 10, 11 to the external device 12 after a connection loss of that hearing device (lower part of FIG. 8). When establishing a connection between the external device 12 and each of the hearing devices 10, 11 (i.e., when establishing the links 30, 31), the hearing devices 10, 11 both scan for an external device (cf., step A1), thereby receiving an advertising message from the external device 12, whereupon the respective link 30, 31 is established (step A2). The external device 12 continues to transmit advertising messages (step A3) even when transmitting audio signals via the links 30, 31 to the hearing devices 10, 11 (step A4). In step A5 an interruption of the link 30 to the left ear hearing device 10 is illustrated, while the link 31 to the right ear hearing device 11 still operates to transmit audio signals to the device 11.

In step A6 the link loss is detected by the left ear hearing device 10, whereupon the device 10 transmits via the binaural link 32 a message to the right ear hearing device 11 in order to obtain information as to whether the link 31 from the external device 12 to the right ear hearing device 11 is still active. Having received the information from the right ear hearing device 11 via the binaural link 32 that the link 31 still is active, the left ear hearing device 10 enters the first scanning mode in which it scans for the external device 12 (see step A7). As a result of such scanning action the left ear hearing device 10 receives one of the regularly repeated advertising messages of the external device 12, whereupon it reestablishes the audio link 30 with the external device 12 (step A8). Having reestablished the link 30, both hearing devices 10, 11 can receive the audio transmission via the links 3Q, 31 (see step A9).

Figure 9:
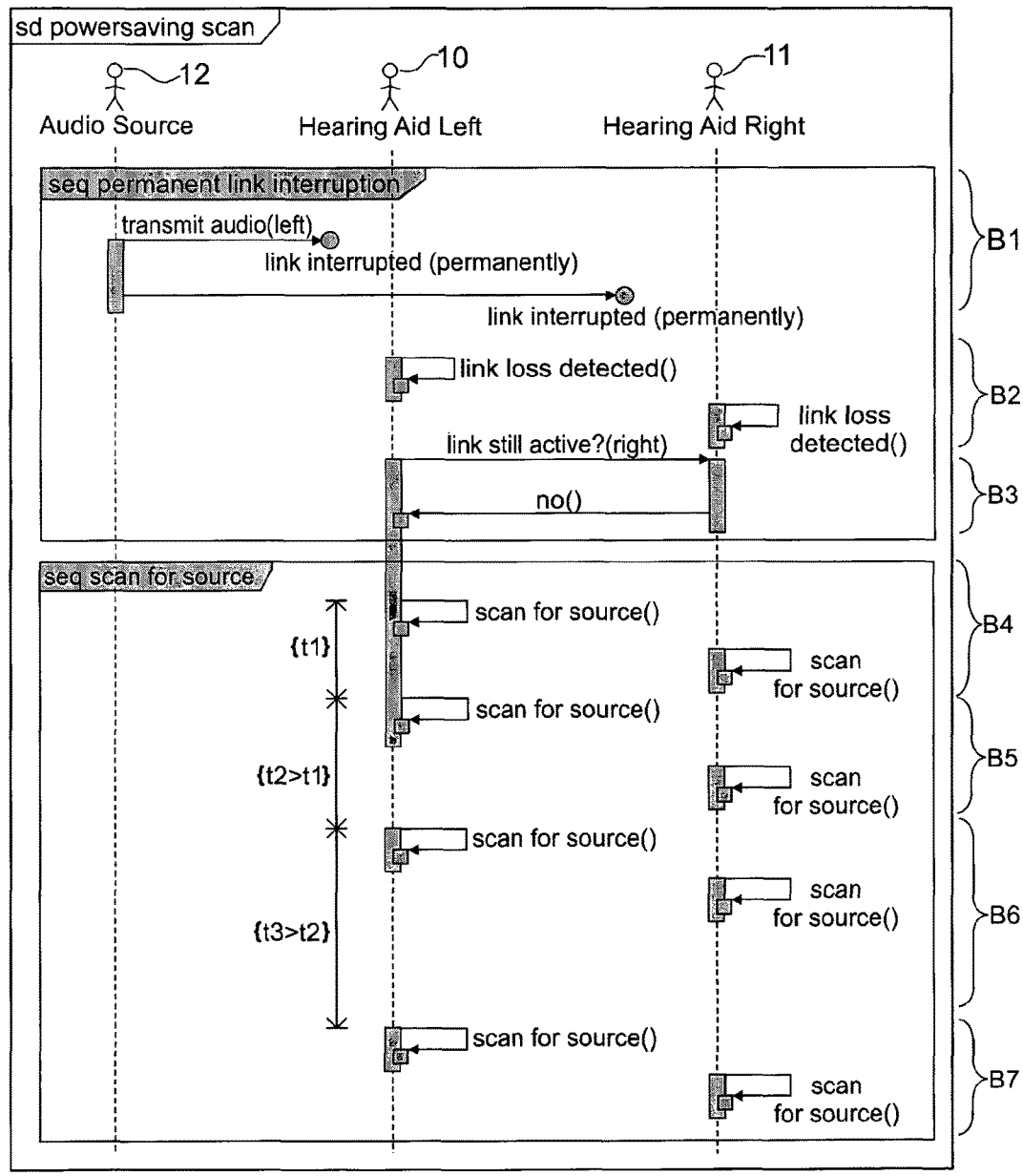
FIG. 9 is a message sequence chart of an example of a scanning process of one of the hearing devices after a connection loss of both hearing devices to the external device.

FIG. 9 shows a message sequence chart of an example of a scanning process of one of the hearing devices 10, 11 after a connection loss of both hearing devices to the external device 12, wherein the interruption of both links 30, 31 is illustrated in step B1. Accordingly, both the left ear hearing device 10 and the right ear hearing device 11 detect a connection loss (step B2). The left ear hearing device 10 sends a message via the binaural link 32 to the right ear hearing device 11 inquiring as to whether the link of the right ear hearing device 11 to the external device 12 is still active, with the right ear hearing device 11 informing, via the binaural link 32, the left ear hearing device 10 that it also has lost its link 31 to the external device 12 (step B3).

As a result of this negative answer, the left ear hearing device 10 enters the second scanning mode while in the beginning of the scanning action the scanning rate is relatively high (see step B4) the scanning rate is reduced with increasing time since the scanning action as started (see steps B5 to B7). Typically, the initial relatively high scanning rate in the second scanning mode (step B4 of FIG. 9) is lower than the scanning rate in the first scanning mode (see step A7 of FIG. 8). The reason is that in case that only one of the hearing devices has lost its link, it is relatively likely that there will be only a relatively short link interruption, so that it is "worth" to invest the relatively high power consumption required for a high scanning rate in order to enable quick reconnection to the external device 12. By contrast, in case of a link loss of both hearing devices 10, 11, it is relatively likely that there will be a longer link interruption, so that it is not worth to invest a high amount of power required by a high scanning rate, thereby reducing power consumption in case of a longer link interruption.

Also the right ear hearing device 11, having lost its connection and—due to the inquiry by the left era hearing device in step B3—being aware that also the left ear hearing device 10 has lost its connection, enters the second scanning mode, with the scanning action of the right ear hearing device 11 alternating with that of left ear hearing device 10 in steps B4 to B7.

What is claimed is:

1. A hearing assistance system, the hearing assistance system comprising:
   a first hearing device;
   a second hearing device; and
   an external audio source device for transmitting an external audio data stream,
   wherein the first and second hearing devices comprise an interface for wireless data exchange with the external audio source device, including receipt of the external audio data stream from the external audio source device, a microphone for capturing an audio signal, wherein each hearing device is adapted to transmit the microphone audio signal via the interface to the external device, the hearing devices adapted to establish a binaural link between the first hearing device and the second hearing device, the hearing assistance system adapted to estimate a link quality from the external device to one of the hearing devices, battery charge state of each of the hearing devices, or an audio signal quality of the microphone audio signal of each hearing device and to communicate a link quality estimation, a battery charge state estimation, or an audio signal quality estimation to one of the two hearing devices,
   the hearing assistance system adapted to determine, based on the link quality estimation, the battery charge state estimation, or the audio quality whether none of the hearing devices, one of the hearing devices, or each hearing device is to transmit its microphone audio signal via its interface to the external device, wherein the external device is a phone device adapted to request a decision concerning transmission of a microphone audio signal from the hearing devices to the external device during a phone call.

2. The system of claim 1, wherein a hearing device having a better estimated battery charge state is selected for transmitting its microphone audio signal to the external device.

3. The system of claim 1, wherein a hearing device having a higher estimated link quality is selected for transmitting its microphone audio signal to the external device.

4. The system of claim 1, wherein a hearing device having a microphone audio signal with the higher estimated audio signal quality is selected for transmitting its microphone audio signal to the external device.

5. The system of claim 1, wherein also the audio signal quality of an audio signal captured by a microphone of the external device is estimated and wherein a microphone audio signal having a highest estimated audio signal quality is selected as input to the external device.

6. The system of claim 1, wherein the hearing assistance system is adapted to adjust coding of the microphone audio signals transmitted from at least one of the hearing devices to the external device according to the estimated link quality or the estimated battery charge states.

7. The system of claim 1, wherein the hearing devices are adapted to communicate with each other such that both hearing devices jointly decide to start to stimulate a respective ear according to the received audio data stream only once the estimated link quality is above a given threshold value for both the link from the external device to the first hearing device and the link from the external device to the second hearing device.

8. The system of claim 1, wherein the hearing devices are adapted to automatically attempt to reconnect to the external device within a given timeout period after loss of the connection.

9. The system of claim 8, wherein the hearing devices are adapted to communicate loss of connection with the external device with the timeout period starting at the time when both hearing devices have lost their connection to the external device.

10. A method of providing hearing assistance, the method comprising:
   establishing a binaural link between a first hearing device and a second hearing device;
   establishing a data link between each of the hearing devices and an external audio source device for transmitting an external audio data stream from the external device to the hearing devices;
   capturing an audio signal by a microphone each of the hearing devices;
   estimating a quality of a link from the external device to one of the hearing devices, a battery charge state of each of the hearing devices, or the audio quality of the microphone audio signal of each hearing device;
   communicating the link quality estimation, the battery charge state estimation, or the audio quality estimation to one of the hearing devices; and
   determining, based on the link quality estimation, the battery charge state estimation, or the audio quality estimation whether none of the hearing devices, one of the hearing devices, or each hearing device transmits its microphone audio signal via a data link to the external device,
   wherein the external device is a phone device adapted to request a decision concerning transmission of a microphone audio signal from the hearing devices to the external device during a phone call.

11. A hearing system, the hearing system comprising:
a first hearing device;
a second hearing device, and
   wherein the first and second hearing devices are configured to wirelessly exchange data with an external device,
   wherein the first and second hearing devices comprise a microphone for capturing an audio signal,
   wherein the first and second hearing device are configured to transmit the audio signal to the external device,
   wherein the first and second hearing devices are configured to: establish a binaural link between the hearing devices, estimate a link quality from the external device to one of the hearing devices, estimate a battery charge state of the hearing device, or estimate an audio signal quality of the microphone audio signal;
   wherein the first and second hearing devices are configured to communicate a link quality estimation, a battery charge state estimation, or an audio signal quality estimation to each other or the external device,
   wherein the first and second hearing devices are adapted to determine, based on the link quality estimation, the battery charge state estimation, or the audio quality whether none of the hearing devices, one of the hearing devices, or each hearing device is to transmit its microphone audio signal via its interface to the external device, and
   wherein the first and second hearing devices are configured to receive a request decision from the external device concerning transmission of a microphone audio signal during a phone call.

* * * * *